(12) United States Patent
Bienert et al.

(10) Patent No.: US 10,810,197 B2
(45) Date of Patent: Oct. 20, 2020

(54) METHOD AND DATABASE COMPUTER SYSTEM FOR PERFORMING A DATABASE QUERY USING A BITMAP INDEX

(71) Applicant: PARSTREAM GMBH, Cologne (DE)

(72) Inventors: Jörg Bienert, Hürth (DE); Michael Hummel, Rösrath (DE); Norbert Heusser, Bonn (DE)

(73) Assignee: Cisco Technology, Inc., San Jose, CA (US)

(*) Notice: Subject to any disclaimer, the term of this patent is extended or adjusted under 35 U.S.C. 154(b) by 344 days.

(21) Appl. No.: 15/573,079

(22) PCT Filed: Apr. 28, 2016

(86) PCT No.: PCT/EP2016/059558
§ 371 (c)(1),
(2) Date: Nov. 9, 2017

(87) PCT Pub. No.: WO2016/174171
PCT Pub. Date: Nov. 3, 2016

(65) Prior Publication Data
US 2018/0121504 A1    May 3, 2018

(30) Foreign Application Priority Data
Apr. 30, 2015   (DE) .................... 10 2015 106 804

(51) Int. Cl.
*G06F 16/2453* (2019.01)
*G06F 16/22* (2019.01)
*G06F 16/2455* (2019.01)

(52) U.S. Cl.
CPC .... *G06F 16/24537* (2019.01); *G06F 16/2237* (2019.01); *G06F 16/2453* (2019.01); *G06F 16/24556* (2019.01)

(58) Field of Classification Search
CPC ........... G06F 16/24537; G06F 16/2453; G06F 16/24556; G06F 16/2237; G06F 16/24534;
(Continued)

(56) References Cited

U.S. PATENT DOCUMENTS

| 8,626,770 B2 | 1/2014 | He et al. |
| 2005/0154710 A1* | 7/2005 | Ruhlow ............... G06F 16/2454 |

(Continued)

FOREIGN PATENT DOCUMENTS

KR    2006 0025225 A    3/2006

OTHER PUBLICATIONS

Shankar et al., "An Algorithm to Evaluate Iceberg Query using Compacted Bitmap Vector", International Journal of Computer Applications (0975-8887) vol. 60 No. 15, dated Dec. 2012, 7 pages.
(Continued)

*Primary Examiner* — Pierre M Vital
*Assistant Examiner* — Andalib F Lodhi
(74) *Attorney, Agent, or Firm* — Behmke Innovation Group LLC; James M. Behmke; Jonathon P. Western

(57) ABSTRACT

Method and apparatus for performing a database query using a bitmap index in a data-base having a plurality of bitmap vectors, the method comprising the steps of: upon receipt of a query containing a selection condition, creating a filter bitmap based on the query input; performing a bitmap scan for the filter bitmap in order to determine at least one value of an existing matching data-base entry; determining a bitmap of the determined at least one value; creating a filtered bitmap by combining the filter bitmap with the bitmap of the determined at least one value; determining all entries in the database matching the filtered bitmap; subtracting the filtered bitmap from the filter bitmap, thus creating a new filter bitmap; repeating the steps, starting
(Continued)

with the step of performing a bitmap scan based on the new filter bitmap, until the step of sub-tracting results in an empty bitmap.

11 Claims, 7 Drawing Sheets

(58) Field of Classification Search
CPC ............... G06F 16/2465; G06F 16/221; G06F 16/24561; G06F 16/248
See application file for complete search history.

(56) References Cited

U.S. PATENT DOCUMENTS

2011/0270871 A1    11/2011  He et al.
2012/0303633 A1*   11/2012  He ..................... G06F 16/2453
                                                              707/745

OTHER PUBLICATIONS

Meisen et al., Research Gate, "Bitmap-Based on-Line Analytical Processing of Time Interval Data", Conference Paper, dated Apr. 2015, 13 pages.
Kaser et al., "Histogram-Aware Sorting for Enhanced Word-Aligned Compression in Bitmap Indexes", DOLAP'08, Oct. 30, 2008, Napa Valley, California, USA, 8 pages.
He et al.: "Efficient iceberg Query Evaluation Using Compressed Bitmap Index", IEEE Transactions on Knowledge and Data Engineering, IEEE Service Center, Los Alamitos, California, US.
Office Action dated Apr. 8, 2020 in connection with European Application No. 16719086.7.

* cited by examiner

| | kind | country | date | amount |
|---|---|---|---|---|
| 3 | kiwi | NZ | 05.03.14 | 6 |
| 4 | apple | AT | 07.08.14 | 6 |
| 5 | kiwi | AU | 07.03.14 | 8 |
| 6 | apple | AT | 07.08.14 | 8 |
| 7 | apple | AT | 07.08.14 | 11 |
| 8 | apple | AT | 07.08.14 | 12 |
| 9 | apple | AT | 07.08.14 | 15 |
| 10 | apple | AT | 07.08.14 | 16 |
| 11 | kiwi | NZ | 06.03.14 | 17 |
| 12 | kiwi | AU | 05.03.14 | 18 |
| 13 | apple | AT | 08.08.14 | 19 |
| 14 | kiwi | NZ | 07.03.14 | 20 |
| 15 | kiwi | AU | 03.08.14 | 20 |
| 16 | apple | DE | 03.08.14 | 20 |
| 17 | apple | AT | 08.08.14 | 20 |
| 18 | apple | AT | 07.08.14 | 21 |
| 19 | apple | AT | 08.08.14 | 22 |
| 20 | kiwi | NZ | 05.03.14 | 23 |
| 21 | kiwi | AU | 05.03.14 | 26 |
| 22 | apple | FR | 03.08.14 | 26 |
| 23 | kiwi | NZ | 07.03.14 | 37 |
| 24 | kiwi | AU | 07.03.14 | 39 |
| 25 | kiwi | NZ | 06.03.14 | 40 |
| 26 | kiwi | AU | 06.03.14 | 40 |
| 27 | kiwi | NZ | 06.08.14 | 43 |

| | kind | country | date | amount |
|---|---|---|---|---|
| 28 | kiwi | NZ | 07.03.14 | 44 |
| 29 | kiwi | AU | 07.08.14 | 45 |
| 30 | kiwi | NZ | 06.03.14 | 46 |
| 31 | kiwi | AU | 06.08.14 | 46 |
| 32 | kiwi | NZ | 07.03.14 | 47 |
| 33 | kiwi | AU | 07.08.14 | 47 |
| 34 | kiwi | AU | 05.03.14 | 49 |
| 35 | apple | DE | 03.08.14 | 53 |
| 36 | apple | FR | 04.08.14 | 55 |
| 37 | apple | DE | 04.08.14 | 60 |
| 38 | apple | FR | 04.08.14 | 62 |
| 39 | apple | DE | 05.08.14 | 70 |
| 40 | apple | FR | 05.08.14 | 79 |
| 41 | apple | DE | 05.08.14 | 112 |
| 42 | apple | FR | 06.08.14 | 118 |
| 43 | apple | DE | 05.08.14 | 120 |
| 44 | apple | FR | 05.08.14 | 120 |
| 45 | apple | DE | 06.08.14 | 130 |
| 46 | apple | DE | 06.08.14 | 134 |
| 47 | apple | FR | 07.08.14 | 135 |
| 48 | apple | FR | 06.08.14 | 138 |
| 49 | apple | DE | 06.08.14 | 140 |
| 50 | apple | DE | 06.08.14 | 141 |
| 51 | apple | FR | 06.08.14 | 142 |
| 52 | apple | FR | 06.08.14 | 149 |

FIG. 3

|    | A     | B    | C  | D  | E  | F  | G  | H  | I  | J  |
|----|-------|------|----|----|----|----|----|----|----|----|
|    | kind  |      | country | | | | | | | |
| 2  | apple | kiwi | AT | AU | CA | DE | FI | FR | LT | NZ |
| 3  |       | 1    |    |    |    |    |    |    |    | 1  |
| 4  | 1     |      | 1  |    |    |    |    |    |    |    |
| 5  |       | 1    |    | 1  |    |    |    |    |    |    |
| 6  | 1     |      | 1  |    |    |    |    |    |    |    |
| 7  | 1     |      | 1  |    |    |    |    |    |    |    |
| 8  | 1     |      | 1  |    |    |    |    |    |    |    |
| 9  | 1     |      | 1  |    |    |    |    |    |    |    |
| 10 | 1     |      | 1  |    |    |    |    |    |    |    |
| 11 |       | 1    |    |    |    |    |    |    |    | 1  |
| 12 |       | 1    |    | 1  |    |    |    |    |    |    |
| 13 | 1     |      | 1  |    |    |    |    |    |    |    |
| 14 |       | 1    |    |    |    |    |    |    |    | 1  |
| 15 |       | 1    |    | 1  |    |    |    |    |    |    |
| 16 | 1     |      |    |    |    | 1  |    |    |    |    |
| 17 | 1     |      | 1  |    |    |    |    |    |    |    |
| 18 | 1     |      | 1  |    |    |    |    |    |    |    |
| 19 | 1     |      | 1  |    |    |    |    |    |    |    |
| 20 |       | 1    |    |    |    |    |    |    |    | 1  |
| 21 |       | 1    |    | 1  |    |    |    |    |    |    |
| 22 | 1     |      |    |    |    |    |    | 1  |    |    |
| 23 |       | 1    |    |    |    |    |    |    |    | 1  |
| 24 |       | 1    |    | 1  |    |    |    |    |    |    |
| 25 |       | 1    |    |    |    |    |    |    |    | 1  |
| 26 |       | 1    |    | 1  |    |    |    |    |    |    |
| 27 |       | 1    |    |    |    |    |    |    |    | 1  |
| 28 |       | 1    |    |    |    |    |    |    |    | 1  |
| 29 |       | 1    |    | 1  |    |    |    |    |    |    |
| 30 |       | 1    |    |    |    |    |    |    |    | 1  |
| 31 |       | 1    |    | 1  |    |    |    |    |    |    |
| 32 |       | 1    |    |    |    |    |    |    |    | 1  |
| 33 |       | 1    |    | 1  |    |    |    |    |    |    |
| 34 |       | 1    |    | 1  |    |    |    |    |    |    |
| 35 | 1     |      |    |    |    | 1  |    |    |    |    |
| 36 | 1     |      |    |    |    |    |    | 1  |    |    |
| 37 | 1     |      |    |    |    | 1  |    |    |    |    |
| 38 | 1     |      |    |    |    |    |    | 1  |    |    |
| 39 | 1     |      |    |    |    | 1  |    |    |    |    |
| 40 | 1     |      |    |    |    |    |    | 1  |    |    |
| 41 | 1     |      |    |    |    | 1  |    |    |    |    |
| 42 | 1     |      |    |    |    |    |    | 1  |    |    |
| 43 | 1     |      |    |    |    | 1  |    |    |    |    |
| 44 | 1     |      |    |    |    |    |    | 1  |    |    |
| 45 | 1     |      |    |    |    | 1  |    |    |    |    |
| 46 | 1     |      |    |    |    | 1  |    |    |    |    |
| 47 | 1     |      |    |    |    |    |    | 1  |    |    |
| 48 | 1     |      |    |    |    |    |    | 1  |    |    |
| 49 | 1     |      |    |    |    | 1  |    |    |    |    |
| 50 | 1     |      |    |    |    | 1  |    |    |    |    |
| 51 | 1     |      |    |    |    |    |    | 1  |    |    |
| 52 | 1     |      |    |    |    |    |    | 1  |    |    |

FIG. 4A

|   | K | L | M | N | O | P | Q | R | S | T | U | V | W | X | Y |
|---|---|---|---|---|---|---|---|---|---|---|---|---|---|---|---|
|   |   |   |   |   |   | date |   |   |   |   |   |   | A | 07.08.2014 |   |
| 2 | 5.3 | 6.3 | 7.3 | 8.3 | ... | 3.8 | 4.8 | 5.8 | 6.8 | 7.8 | 8.8 | 9.8 | "apple" & "AT" | W & "07.8.14" | W - X |
| 3 | 1 |   |   |   |   |   |   |   |   |   |   |   |   |   |   |
| 4 |   |   |   |   |   |   |   |   |   | 1 |   |   | 1 | 1 |   |
| 5 |   |   | 1 |   |   |   |   |   |   |   |   |   |   |   |   |
| 6 |   |   |   |   |   |   |   |   |   | 1 |   |   | 1 | 1 |   |
| 7 |   |   |   |   |   |   |   |   |   | 1 |   |   | 1 | 1 |   |
| 8 |   |   |   |   |   |   |   |   |   | 1 |   |   | 1 | 1 |   |
| 9 |   |   |   |   |   |   |   |   |   | 1 |   |   | 1 | 1 |   |
| 10 |   |   |   |   |   |   |   |   |   | 1 |   |   | 1 | 1 |   |
| 11 |   | 1 |   |   |   |   |   |   |   |   |   |   |   |   |   |
| 12 | 1 |   |   |   |   |   |   |   |   |   |   |   |   |   |   |
| 13 |   |   |   |   |   |   |   |   |   |   | 1 |   | 1 |   | 1 |
| 14 |   |   | 1 |   |   |   |   |   |   |   |   |   |   |   |   |
| 15 |   |   | 1 |   |   |   |   |   |   |   |   |   |   |   |   |
| 16 |   |   |   |   |   | 1 |   |   |   |   |   |   |   |   |   |
| 17 |   |   |   |   |   |   |   |   |   |   | 1 |   | 1 |   | 1 |
| 18 |   |   |   |   |   |   |   |   |   | 1 |   |   | 1 | 1 |   |
| 19 |   |   |   |   |   |   |   |   |   |   | 1 |   | 1 |   | 1 |
| 20 | 1 |   |   |   |   |   |   |   |   |   |   |   |   |   |   |
| 21 | 1 |   |   |   |   |   |   |   |   |   |   |   |   |   |   |
| 22 |   |   |   |   |   | 1 |   |   |   |   |   |   |   |   |   |
| 23 |   |   | 1 |   |   |   |   |   |   |   |   |   |   |   |   |
| 24 |   |   | 1 |   |   |   |   |   |   |   |   |   |   |   |   |
| 25 |   | 1 |   |   |   |   |   |   |   |   |   |   |   |   |   |
| 26 |   | 1 |   |   |   |   |   |   |   |   |   |   |   |   |   |
| 27 |   |   |   |   |   |   |   | 1 |   |   |   |   |   |   |   |
| 28 |   |   | 1 |   |   |   |   |   |   |   |   |   |   |   |   |
| 29 |   |   |   |   |   |   |   |   | 1 |   |   |   |   |   |   |
| 30 |   | 1 |   |   |   |   |   |   |   |   |   |   |   |   |   |
| 31 |   |   |   |   |   |   |   | 1 |   |   |   |   |   |   |   |
| 32 |   |   | 1 |   |   |   |   |   |   |   |   |   |   |   |   |
| 33 |   |   |   |   |   |   |   |   | 1 |   |   |   |   |   |   |
| 34 | 1 |   |   |   |   |   |   |   |   |   |   |   |   |   |   |
| 35 |   |   |   |   |   | 1 |   |   |   |   |   |   |   |   |   |
| 36 |   |   |   |   |   |   | 1 |   |   |   |   |   |   |   |   |
| 37 |   |   |   |   |   |   | 1 |   |   |   |   |   |   |   |   |
| 38 |   |   |   |   |   |   | 1 |   |   |   |   |   |   |   |   |
| 39 |   |   |   |   |   |   |   | 1 |   |   |   |   |   |   |   |
| 40 |   |   |   |   |   |   |   | 1 |   |   |   |   |   |   |   |
| 41 |   |   |   |   |   |   |   | 1 |   |   |   |   |   |   |   |
| 42 |   |   |   |   |   |   |   |   | 1 |   |   |   |   |   |   |
| 43 |   |   |   |   |   |   |   |   | 1 |   |   |   |   |   |   |
| 44 |   |   |   |   |   |   |   |   | 1 |   |   |   |   |   |   |
| 45 |   |   |   |   |   |   |   | 1 |   |   |   |   |   |   |   |
| 46 |   |   |   |   |   |   |   | 1 |   |   |   |   |   |   |   |
| 47 |   |   |   |   |   |   |   |   | 1 |   |   |   |   |   |   |
| 48 |   |   |   |   |   |   |   | 1 |   |   |   |   |   |   |   |
| 49 |   |   |   |   |   |   |   | 1 |   |   |   |   |   |   |   |
| 50 |   |   |   |   |   |   |   | 1 |   |   |   |   |   |   |   |
| 51 |   |   |   |   |   |   |   | 1 |   |   |   |   |   |   |   |
| 52 |   |   |   |   |   |   |   | 1 |   |   |   |   |   |   |   |

FIG. 4B

|   | Z | AA | AB | AC | AD | AE | AF | AG | AH |
|---|---|---|---|---|---|---|---|---|---|
|   | 08.08.2014 | | | DE | 03.08.2014 | | 04.08.2014 | | 05.08.2014 |
| 2 | Y & "08.08.14" | Y - Z | "apple" - W | AB & "DE" | AC & "03.08.14" | AC - AD | AE & "04.08.14" | AE-AF | AG & "05.08.14" |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | 1 | | | | | | | | |
| 14 | | | | | | | | | |
| 15 | | | | | | | | | |
| 16 | | | 1 | 1 | 1 | | | | |
| 17 | 1 | | | | | | | | |
| 18 | | | | | | | | | |
| 19 | | | | | | | | | |
| 20 | | | | | | | | | |
| 21 | | | | | | | | | |
| 22 | 1 | | 1 | | | | | | |
| 23 | | | | | | | | | |
| 24 | | | | | | | | | |
| 25 | | | | | | | | | |
| 26 | | | | | | | | | |
| 27 | | | | | | | | | |
| 28 | | | | | | | | | |
| 29 | | | | | | | | | |
| 30 | | | | | | | | | |
| 31 | | | | | | | | | |
| 32 | | | | | | | | | |
| 33 | | | | | | | | | |
| 34 | | | | | | | | | |
| 35 | | | 1 | 1 | 1 | | | | |
| 36 | | | 1 | | | | | | |
| 37 | | | 1 | 1 | | 1 | 1 | | |
| 38 | | | 1 | | | | | | |
| 39 | | | 1 | 1 | | 1 | | 1 | 1 |
| 40 | | | 1 | | | | | | |
| 41 | | | 1 | 1 | | 1 | | 1 | 1 |
| 42 | | | 1 | | | | | | |
| 43 | | | 1 | 1 | | 1 | | 1 | 1 |
| 44 | | | 1 | | | | | | |
| 45 | | | 1 | 1 | | 1 | | 1 | |
| 46 | | | 1 | 1 | | 1 | | 1 | |
| 47 | | | 1 | | | | | | |
| 48 | | | 1 | | | | | | |
| 49 | | | 1 | 1 | | 1 | | 1 | |
| 50 | | | 1 | 1 | | 1 | | 1 | |
| 51 | | | 1 | | | | | | |
| 52 | | | 1 | | | | | | |

FIG. 4C

METHOD AND DATABASE COMPUTER SYSTEM FOR PERFORMING A DATABASE QUERY USING A BITMAP INDEX

This application is a US national stage application filed under 35 U.S.C. § 371 based upon International Patent Application PCT/EP2016/059558, filed 28 Apr. 2016, which claims the benefit of German application 102015106804.4, filed 30 Apr. 2015, the entire contents of which are hereby incorporated by reference as if fully set forth herein for all purposes.

TECHNICAL FIELD

The present invention relates to a method and a database computer system for performing a database query using a bitmap index.

Databases commonly organize data in the form of tables, each table having a number of rows and columns. Each row in a table generally has a data value associated with each of the columns, such an intersection of rows and columns being called a cell. A system needing access to data in the database typically issues a request in the form of a query. A query usually involves a request for the data contained in one or more cells of any rows which satisfy a particular condition. This condition often involves the comparison of the values of cells in a column to some other value to determine whether the row associated with the compared cell satisfies the condition.

A direct comparison of each cell of interest in a table to a value is often computationally expensive, and database developers have accordingly introduced means by which rows satisfying a comparison operation can be more readily determined without the need to traverse every row of a table. A common optimization involves the use of a tree-based index structure to determine which rows contain a desired value. Each node of the tree represents a distinct value appearing within a particular column in any row of the table. Each node of the tree connects to a data structure representing the set of all rows in the table where the indexed column contains the specified distinct value. One such data structure that can be used to represent a set of rows is a bit array, commonly referred to as bitmap, where each bit with a '1' value within the bitmap corresponds to a row containing the specified distinct value.

This approach is reasonably efficient when an exact value is desired, such as with, for example, a query for all rows in which a particular column has the string value "String". In this approach, the database software would traverse the tree structure to locate the node corresponding to the distinct string value "String" and retrieve an associated bitmap. The rows for which the value of the particular column is "String" would be represented by "set" bits in the bitmap (i.e., bits set to either a '1' or a '0' value in order to indicate that a corresponding row satisfies the condition or fails to satisfy it). As a result, the database software is able to simply retrieve those rows and produce a result set from them. However, in real applications, such as e.g. scientific applications, a basic bitmap index will contain many bitmaps because the attribute cardinalities are high. In these cases, the bitmap indices take a large amount of space, and processing of range queries using these indices may take longer than without an index.

Mining and decision making systems often compute aggregate functions over one or more attributes in very large databases and warehouses as the number of combinations will increase exponentially with the number of columns involved in the grouping. An iceberg query is a class of an aggregate query, which selects aggregate values above a given threshold. An iceberg query is useful because high frequency events or high aggregate values often carry insightful information. Existing techniques for computing iceberg queries can be categorized as tuple-scan based approaches, which require at least one table scan to read data from disk and a significant amount of CPU time to compute the aggregation tuple-by-tuple. Such a tuple-scan based scheme often makes performance of iceberg queries unsatisfactory, especially when the table is large but the returned iceberg result set is very small. These problems are typical for tuple-scan based algorithms, since they cannot obtain the accurate aggregate result without reading and scanning through all the tuples.

US 2012/0078880 A1 discloses a method to accelerate database queries containing bitmap-based conditions, including determining a bitmap, wherein the bitmap represents a set of rows that have satisfied one or more conjunctive conditions which preceded a conjunct that is a disjunction in a query expression and restricting evaluation of a disjunct within the disjunction to the set of rows represented by the bitmap. The known method enables the acceleration of queries containing disjunctions of conditions on a database table.

Shankar et al. disclose in "An Algorithm to Evaluate Iceberg Query using Compacted Bitmap Vector", IJCA, Vol. 60, No. 15, December 2012 an iceberg query evaluation process by reducing the bitwise AND operations needed to find the item pairs, with two solutions to reduce the bitwise AND operations, namely randomly identifying 'N' 1-bit positions instead of first 1-bit position and reducing the zero bit values from the Most Significant Side so that the bitmap vector will be reduced in such a way, the bitwise operations needed is reduced.

U.S. Pat. No. 8,626,770 B2 discloses an iceberg query method implementing an index-pruning based approach, including processing the iceberg query using a bitmap index having a plurality of bitmap vectors in a database, eliminating any of the plurality of bitmap vectors in the bitmap index that fails to meet a given condition thereby forming a subset of the plurality of bitmap vectors and aligning the vectors in the subset of the plurality of bitmap vectors in the bitmap index according to respective positions of the bitmap vectors in the subset of the plurality of bitmap vectors.

The aim of the invention is to provide a query approach whose complexity only increases linearly with the number of existing groups.

SUMMARY

To this end, the invention provides a method and an apparatus (database computer system) for performing a database query using a bitmap index with the features of claims 1 and 9, respectively.

According to the invention, a filter bitmap is created based on a query. The filter bitmap is used to perform a bitmap scan and fetch the so-called GroupBy values of the according column stores for a non zero bit of the filter bitmap. This allows determining a GroupBy value tuple, and a group bitmap is determined on that basis and combined with the filter bitmap. The result is a filtered group bitmap on the basis of which aggregation function result(s) is/are calculated. The filtered group bitmap is then subtracted from the filter bitmap, and the resulting new filter bitmap is then the basis for the next iterative step, unless it is empty.

The basic idea of the invention thus consists in using the available information in both the bitmap space and the actual value (column store) space. Other than in an Iceberg Query, all data is actually used for the query evaluation, while the aim of the Iceberg Query is to calculate as little as possible (thus the name). By using a filter bitmap, assigning an existing value information, creating a bitmap to successively processing all matching entries and then subtracting the search combination from the filter bitmap to create the next existing combination, the amount of necessary iterations is reduced as only the required combinations are used.

According to a first aspect of the invention, the bitmap used for performing the query is a group bitmap based on a tuple of values matching with the initial search query.

According to another aspect of the invention, using the same basic principle, a number of filter bitmaps is used in subsequent iteration levels based on one value per column store of the database.

The invention also covers a computer program with program coding means which are suitable for carrying out a method according to the invention as described above when the computer program is run on a computer. The computer program itself as well as stored on a computer-readable medium is claimed.

Further features and embodiments of the invention will become apparent from the description and the accompanying drawings.

It will be understood that the features mentioned above and those described hereinafter can be used not only in the combination specified but also in other combinations or on their own, without departing on this scope of the present invention.

The invention is schematically illustrated in the drawings by means of an embodiment by way of example and is hereinafter explained in detail with reference to the drawings. It is understood that the description is in now way limiting on the scope of the present invention and is merely an illustration of a preferred embodiment of the invention.

BRIEF DESCRIPTION OF THE DRAWINGS

FIG. 3 shows as an illustrative example an excerpt of a table of harvesting data of various fruit in different countries.

FIG. 4 shows a spreadsheet with bitmap data of the table data of FIG. 3.

DETAILED DESCRIPTION

Figure 1:
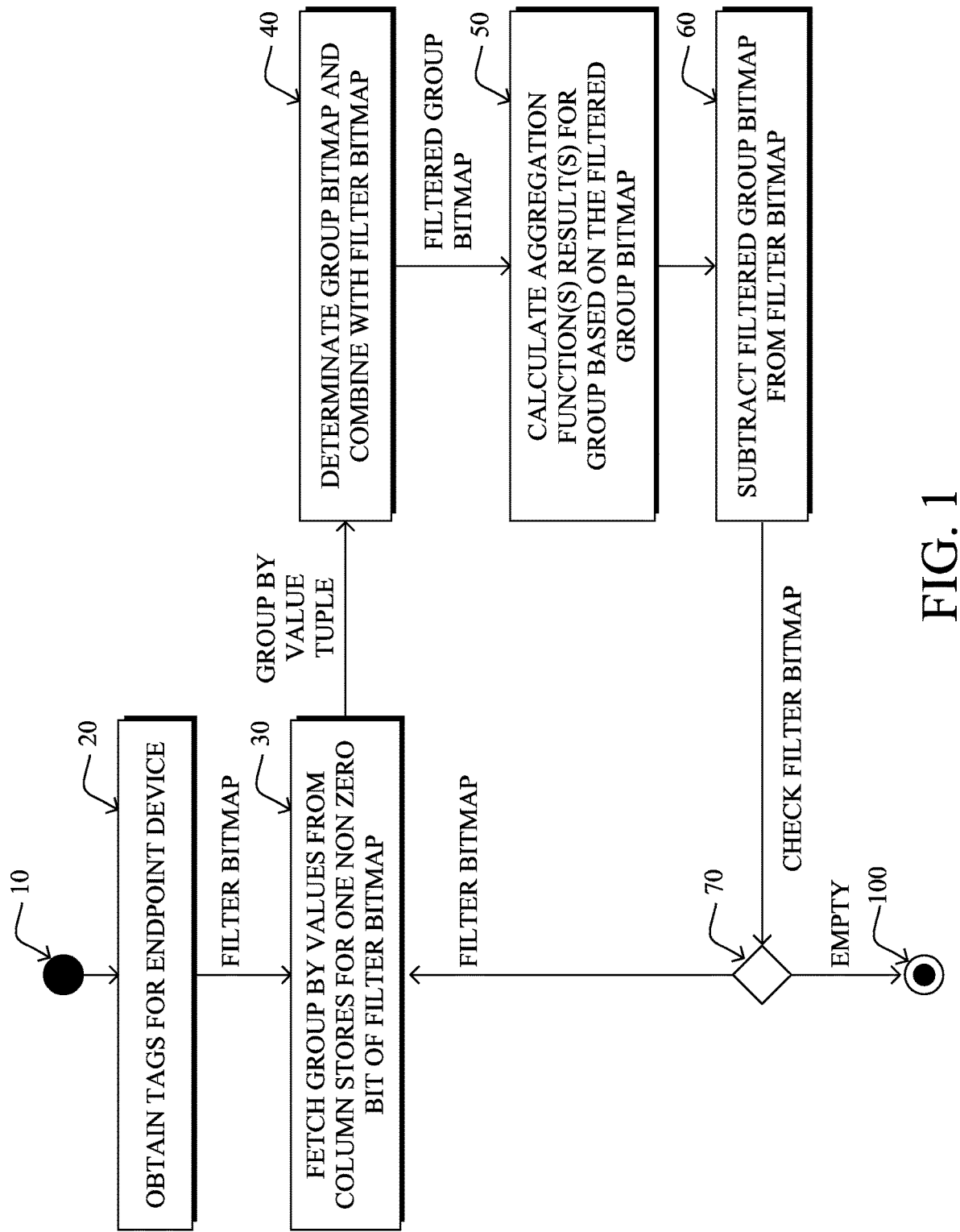
FIG. 1 shows a schematic block diagram depiction illustrating the general approach of the invention.

FIG. 1 shows a schematic depiction illustrating the general approach of the invention. The invention may be called an iterative bitmap GroupBy general algorithm.

As depicted in FIG. 1, the algorithm according to the method of the invention starts at 10 for performing a database query where a query containing a selection condition is received.

At 20, a bitmap is created based on a filter condition contained in the query. The result of the bitmap creation, the so-called filter bitmap, is then used at 30 to determine an entry in the database for a non zero bit of the filter bitmap, and the according GroupBy values are fetched from the database, i.e. the column stores. Or, in other words, in step 30, an arbitrary entry in the column stores is identified which would satisfy the original filter condition contained in the query input.

The Groupby value tuple created in step 30 is then used, in the bitmap space, at 40 to determine the according group bitmap and combine the same with the filter bitmap. The result is a so-called filtered group bitmap which is then used at 50 to calculate aggregation function result(s) for the group. Or, in other words, the group bitmap is used to successively identify all entries matching the filtered group bitmap.

After having processed all entries, the next/new filter bitmap is calculated by subtracting the filtered group bitmap used in step 50 from the filter bitmap created in step 20 on which the filtered group bitmap is based at 60. The resulting filter bitmap is checked at 70 whether it is all zero or not. In case the new filter bitmap is all zero, i.e. empty, the query ends at 100. In case the new filter bitmap still contains any "1", the process goes back to step 30 and continues the iterative process by fetching the next group by values corresponding to an entry bit of the filter bitmap.

Figure 2:
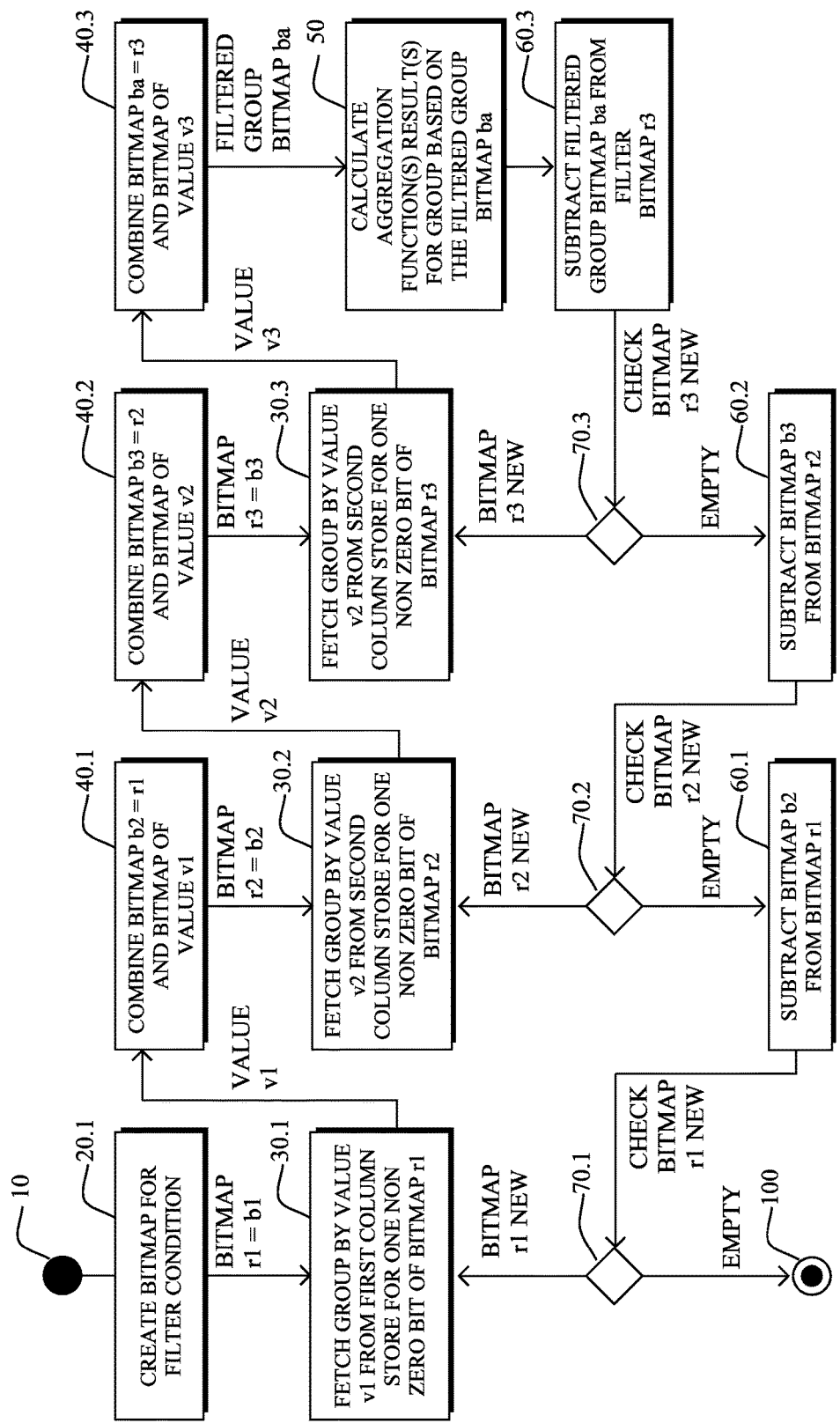
FIG. 2 shows a schematic block diagram depiction illustrating the approach of the invention in more detail.

FIG. 2 shows the method of the invention in more detail with an explicit depiction of the sublevels for three columns. The same method steps are designated with the same reference numerals. It is to be understood that the method can be extended to any number of levels depending on the number of column stores of the database to be searched.

At 20.1, a first level bitmap b1 is created based on a filter condition contained in the query. The initial bitmap b1 is kept and a copy (or temporary) bitmap r1 is used for further processing at 30.1 to fetch a first GroupBy value v1 from the first column store of the data-base for one non zero bit in the filter bitmap r1 created at 20.1. The first level filter bitmap r1 is then combined with the bitmap of GroupBy value v1 at 40.1 in order to create a second level filter bitmap b2. Again, the initial bitmap b2 is kept and a copy r2 thereof is used for further processing. Then, on the basis of the second level bitmap r2, the value v2 for second Groupby column is fetched from its column store of the database at 30.2. At 40.2, the bitmap of the second value v2 is combined with the second level filter bitmap r2 in order to create a third level bitmap b3=r3, accordingly. The according step is repeated at 30.3 for the third column store from which the value v3 for the third GroupBy column is fetched for a non zero bit of the third level bitmap r3. On the basis of this third value v3, a filtered group bitmap ba is created at 40.3 by combining the bitmap of the third value v3 with the third bitmap r3.

At 50, the aggregation function results are calculated as described above, and at 60.3, the filtered group map ba is subtracted from the third level filter bitmap r3. The remaining (i.e. new) temporary third level bitmap r3 is checked at 70.3; if it still has content, the steps are reiterated starting at 30.3, otherwise, i.e. in case the remaining bitmap r3 is empty, the initial according third level bitmap b3 is subtracted from the second level bitmap r2 at 60.2, and the remaining new temporary second level bitmap r2 is checked at 70.2 analogously (the basic principle being a variation of the last value in the bitmap). In case the remaining bitmap r2 still has content, the steps are reiterated at 30.2 (and 30.3), otherwise, the initial according second level bitmap b2 is subtracted from the first level temporary bitmap r1 at 60.1, and the remaining new first level bitmap r1 is checked in the same manner at 70.1. In case the remaining first level bitmap r1 still has a content, the steps are reiterated starting at 30.1, otherwise the process stops at 100.

Referring to FIGS. 3 and 4, the invention is now illustrated by means of a practical example.

FIG. 3 shows (an excerpt of) a table of harvesting data of various fruit in different countries. For exemplary reasons, the depiction of FIG. 3 is limited to two different kinds of fruit, namely kiwi and apple, harvested in different countries over a certain period of time. The first column of the table of FIG. 3 indicates the row number, the second column contains the kind of fruit, the third column the country in which the fruit was harvested, the fourth column the harvesting date and the fifth and last column the amount. Multiple rows of data for each combination of kind of fruits, country and date may exist.

FIG. 4 shows a spreadsheet having the according bitmaps of the data contained in the table of FIG. 3 in columns A to V, and the aggregation calculations in the following columns W to AH.

In a bitmap index, a "1" indicates a row in which an according value occurs. In the example case of a query which seeks to know where and when apples were harvested/picked, column A (i.e. the left most column in FIG. 4) corresponds to the bitmap for the filter condition "kind"=apple.

In order to calculate the desired query result, this first bitmap is taken and successively combined with all combinations of the searched columns. This means, for example, a first combination of the bitmap of a column A "apple" with the bitmap of column C "Austria" as well as the bitmap for column "K5.3." (i.e. the date 5 March). With this filtered group bitmap, the requested sum of the column "amount" can be calculated for the group directly by summing up the values of the column "amount" in which the bitmap has a "1".

In order to process the query with the described filter condition, we start with the filter bitmap for apples. From this bitmap, a "1" is arbitrarily chosen. For example, the first value (row 4) can be taken. From the column store containing the raw data, the corresponding value in row 4 is taken from the column country, i.e. Austria in the embodiment shown in FIG. 4. This means, there must be at least one result for Austria. To this end, the bitmap of all the results containing Austria can be calculated as the combination of "apple" and "Austria". From this combination, the first bit is taken, i.e. the first "1" occurring in the column "date" which is 7 August taken from the column store raw data. And, we have identified the first existing combination "Austria" and "7.8." With the bitmap combination in column "X" and the content in column "amount" (the latter not shown in FIG. 4), the sum of amount can be calculated and output.

Then, as a next step, the next date of the combination "apple" and "Austria" is looked for. To this end, according to the invention, the filtered group bitmap X is subtracted from filter bitmap W which leads to a remaining bitmap "apple" and "Austria" but not "7.8.". Based on this differential bitmap (new filter bitmap), the next bit occurring in the "date" column is determined and the corresponding value is taken from the column store which is "8.8.", i.e. 8 August. With this combination filtered group bitmap, the next combination can be calculated (column Z) which allows again to calculate the result of the group.

Then again, the filtered group bitmap is subtracted from the filter bitmap as shown in column AA, and the result is a void bitmap. This means that we have determined all existing dates for Austria.

As a next step, the iteration is analogously continued on the level of the other countries, i.e. the remaining country columns D to J. Or in other words, the combination bitmap "apple" and "Austria" of column W is subtracted from the bitmap "apple" of column A the result (cf. column AB) the first bit is arbitrarily chosen which occurs in row 16, and the next occurring "country" is taken from the column stores which is "DE" (Germany). Then, the dates corresponding to this combination in column AC are successively determined which are 3 August in rows 16 and 35, 4 August in row 37, 5 August in rows 39 and 41, 5 August in row 43, 6 August in rows 45 and 46 as well as in rows 49 and 50.

According to the invention, only the bitmap combinations of the actually existing values are used, as this can be seen from the visualization in columns W to AH of FIG. 4. The first chosen value is arbitrary, but might be the first found value as in the example of FIG. 4 (where the first row containing a "1" for apple. i.e. row no. 4, is used). The according country value is "AT", taken from 4th row of the column "country" from FIG. 3. Thus, there must be at least one result for the combination of "apple" and "Austria". The bitmap of all results containing Austria is then calculated in column W (cf. entries in rows 4, 6 to 10, 13 and 17 to 19).

From these combinations, again an arbitrary bit is chosen (in the example the first entry), and the according date value (7 August) is taken from the column store for column "date" in FIG. 3, resulting in an entry in field X4 of the spreadsheet and entries of the according other values in fields X6 to X10, and X18. In order to find the next relevant day when apples were harvested in Austria, the group bitmap X (which is 01011111000000010 in rows 2 to 19, the remaining zeros in rows 20 to 52 omitted) is subtracted from bitmap W (which is 01011111001000111 in rows 2 to 19), resulting in the bitmap indicated in column Y=00000000001000101, i.e. entries in rows 13, 17, and 19). The information of this bitmap is that it is not empty, indicating the combination "apple" AND "AT" NOT "07.08.".

Based on this the next date value can be determined by the column store and the bitmap for the next combination can be calculated (column Z), finding the date 8 August for all remaining entries. The next subtraction leads to an empty bitmap (column AA) which means all possible entries for the combination "apple" AND "AT" were determined. As a consequence, the algorithm goes back one level to the countries, i.e. the bitmap of column W is subtracted from the bitmap "apple" (column A), and the next matching entry is determined which is "DE" (Germany), and the whole process is iterated according to the above description as visualized in the subsequent bitmap columns AB to AH.

The invention provides a method of performing an analytical database query by using the data storage in order to reduce the number of required bitmap combinations instead of iterating over all potential values or value tupies. In each iteration step, the bitmap with the remaining rows needed to inspect in the net iteration is calculated. The result is a database query performance about 50 to 100 times faster than conventional searches.

According to an aspect of the invention, the storage columns to be used in the grouping are sorted upfront to the database search. The sorting may be done according to the degree of compression of the columns, and the column with the best compression level is used first in the iteration of the invention as it allows a faster processing due to lower number of operations.

Figure 5:
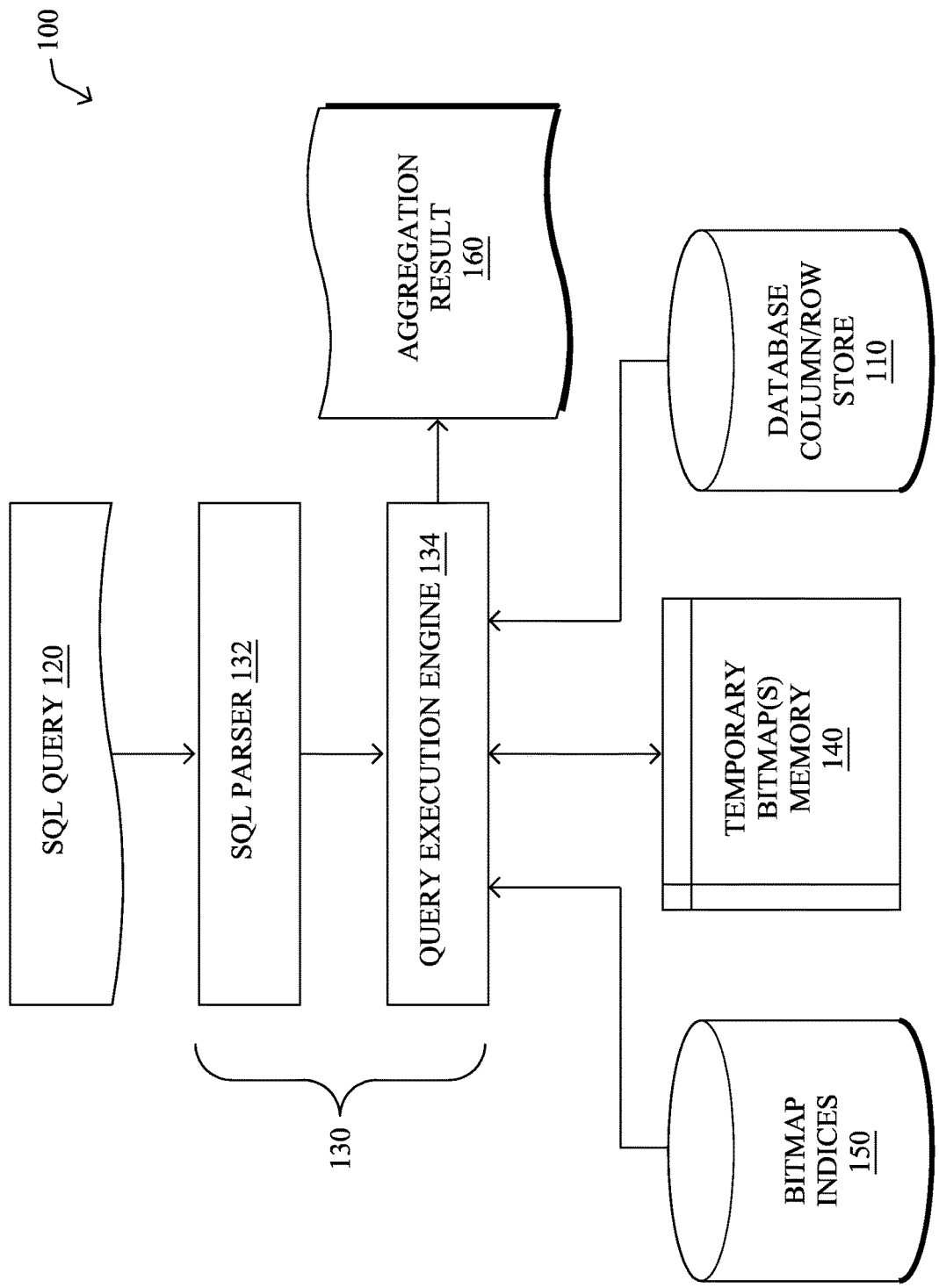
FIG. 5 shows a schematic block diagram depiction of a database computer system of the invention.

FIG. 5 illustrates an exemplary embodiment of a database computer system 100 of the invention. The data-base computer system 100 comprises a column or row store database 110 as well as an input device 120 through which a search query (in the example given: an SQL query) is entered into the system. The database computer system 100 further comprises a computing means 130 which are operably connected with the database 110. In the illustrated example, the computing means 130 includes an SQL Parser 132 which renders a formatted version of the input SQL query which again is fed into a query execution engine 134 (a processing unit with an internal memory in which a computer program for performing a database query according to the invention is stored). The query execution engine 134 retrieves data from the database 110. It is further connected to a temporary bitmap memory 140 into which temporary bitmaps are written during the processing of the query method of the invention as described above and retrieved. Finally, a bitmap indices memory 150 storing the related bitmap indices is connected to the query execution engine 134. The aggregation result of the method of the invention is output through an output device 160 connected to the computing means 130.

The invention claimed is:

1. A method for performing a database query using a bitmap index in a database having a plurality of bitmap vectors, the method comprising the steps of:
   upon receipt of a query containing a selection condition, creating a filter bitmap based on the query;
   performing a bitmap scan for the filter bitmap in order to determine a value group of an existing matching entry of a database, wherein the determined value group comprises a value tuple including first, second, and third values fetched from first, second, and third column stores, respectively, of the database for one non-zero bit in the filter bitmap;
   determining a bitmap of the determined value group;
   creating a filtered group bitmap by combining the filter bitmap with the group bitmap of the determined value group;
   determining all entries in the database matching the filtered group bitmap;
   subtracting the group filtered bitmap from the filter bitmap, thus creating a new filter bitmap; and
   repeating the steps, starting with the step of performing a bitmap scan based on the new filter bitmap, until the step of subtracting results in an empty bitmap;
   wherein the steps are performed by a database computer system.

2. The method of claim 1, wherein the step of determining all entries in the database matching the filter bitmap is a calculation of aggregation functions of the filtered bitmap.

3. The method of claim 1, further comprising sorting database columns before the step of performing the bitmap scan for the filter bitmap.

4. The method of claim 3, further comprising sorting the database columns according to compression level.

5. A method for performing a database query using a bitmap index in a database having a plurality of bitmap vectors, the method comprising the steps of:
   1. upon receipt of a query containing a selection condition, creating a first level filter bitmap (r1) based on the query;
   2. determining a number of iteration levels 1 to n depending on a number of column stores contained in the database, n being an integer number >1;
   3. performing a bitmap scan for the first level filter bitmap (r1) in order to determine a value (v1) of an existing matching database entry;
   4. determining a second level filter bitmap (r2) of the determined value (v1) by combining the first level filter bitmap (r1) with the bitmap of the determined value (v1);
   4a. repeating the steps of performing a bitmap scan for an $x^{th}$ level filter bitmap (rx) and determining the $x^{th}$ level filter bitmap (rx) until a $n^{th}$ level filter bitmap, with x=2 to n, the $n^{th}$ level filter bitmap constituting a filtered group bitmap (ba);
   5. determining all entries in the database matching the filtered group bitmap (ba);
   6. subtracting the filtered group bitmap (ba) from the $n^{th}$ level filter bitmap (rn), thus creating a new $n^{th}$ level filter bitmap;
   4b. repeating the steps on the $n^{th}$ level, starting with the step of performing a bitmap scan based on the new filter bitmap (rn), until the step of subtracting results in an empty nth level filter bitmap;
   4c. repeating above steps 4a, 5, 6, and 4b for each consecutive lower level filter bitmap (ry), with y=n−1 to 1, until the step of subtracting results in an empty 1st level filter bitmap; and
   outputting the entries as a search result for the query,
   wherein the steps are performed by a database computer system.

6. The method of claim 5, further comprising sorting the database columns before the step of performing a bitmap scan for the filter bitmap.

7. The method of claim 6, further comprising sorting the database columns according to compression level.

8. A database computer system comprising:
   a column or row store database;
   a bitmap index storage;
   a computing means operably connected with the database and the bitmap index storage, the computing means further comprising a processor with an internal memory for performing a database query based on a search query received via an input device;
   the internal memory comprising a computer program with program coding means which are suitable for carrying out, when the computer program is run on a computer, and using a bitmap index in the database having a plurality of bitmap vectors, the bitmap index being stored in the bitmap index storage:
   upon receipt of a query containing a selection condition, creating a filter bitmap based on the query;
   performing a bitmap scan for the filter bitmap in order to determine a value group of an existing matching entry of a database, wherein the determined value group comprises a value tuple including first, second, and third values fetched from first, second, and third column stores, respectively, of the database for one non-zero bit in the filter bitmap;
   determining a bitmap of the determined value group;
   creating a filtered group bitmap by combining the filter bitmap with the group bitmap of the determined value group;
   determining all entries in the database matching the filtered group bitmap;
   subtracting the group filtered bitmap from the filter bitmap, thus creating a new filter bitmap; and
   repeating the steps, starting with the step of performing a bitmap scan based on the new filter bitmap, until the step of subtracting results in an empty bitmap; and
   outputting the entries as a search result for the search query.

9. The database computer system according to claim 8, further comprising a temporary bitmap memory for storage of temporary bitmaps.

10. The database computer system according to claim 8, further comprising program coding means which are suitable for carrying out sorting database columns before the step of performing the bitmap scan for the filter bitmap.

11. The database computer system according to claim 10, further comprising program coding means which are suitable for carrying out sorting the database columns according to compression level.

\* \* \* \* \*